United States Patent
Ho et al.

(10) Patent No.: US 10,084,178 B2
(45) Date of Patent: Sep. 25, 2018

(54) METHOD OF PREPARING ELECTRODE ASSEMBLIES

(71) Applicant: GRST International Limited, Hong Kong (HK)

(72) Inventors: Kam Piu Ho, Hong Kong (HK); Ranshi Wang, Hong Kong (HK); Peihua Shen, Guangdong (CN)

(73) Assignee: GRST International Limited, Hong Kong (HK)

( * ) Notice: Subject to any disclaimer, the term of this patent is extended or adjusted under 35 U.S.C. 154(b) by 87 days.

(21) Appl. No.: 15/272,544

(22) Filed: Sep. 22, 2016

(65) Prior Publication Data

US 2018/0083259 A1    Mar. 22, 2018

(51) Int. Cl.
| | | |
|---|---|---|
| *H01M 4/04* | (2006.01) | |
| *H01M 10/0525* | (2010.01) | |
| *H01M 4/131* | (2010.01) | |
| *H01M 4/505* | (2010.01) | |
| *H01M 4/525* | (2010.01) | |
| *H01M 4/66* | (2006.01) | |
| *H01M 4/62* | (2006.01) | |
| *H01M 4/583* | (2010.01) | |
| *H01M 2/16* | (2006.01) | |

(52) U.S. Cl.
CPC ......... *H01M 4/0404* (2013.01); *H01M 2/162* (2013.01); *H01M 2/1646* (2013.01); *H01M 2/1653* (2013.01); *H01M 2/1673* (2013.01); *H01M 4/0471* (2013.01); *H01M 4/131* (2013.01); *H01M 4/505* (2013.01); *H01M 4/525* (2013.01); *H01M 4/583* (2013.01); *H01M 4/622* (2013.01); *H01M 4/623* (2013.01); *H01M 4/625* (2013.01); *H01M 4/661* (2013.01); *H01M 10/0525* (2013.01)

(58) Field of Classification Search
CPC ....................................................... H01M 2/14
See application file for complete search history.

(56) References Cited

U.S. PATENT DOCUMENTS

| | | | | |
|---|---|---|---|---|
| 2014/0242443 | A1* | 8/2014 | Hirai | ........... H01M 2/1653 429/144 |
| 2015/0364737 | A1* | 12/2015 | Miyake | ............. H01G 11/52 429/163 |

FOREIGN PATENT DOCUMENTS

| | | |
|---|---|---|
| CN | 101154750 A | 4/2008 |
| CN | 102299381 A | 12/2011 |
| CN | 103078077 A | 5/2013 |
| KR | 100759543 B1 | 9/2007 |
| KR | 101495761 B1 | 2/2015 |
| KR | 101497348 B1 | 3/2015 |

OTHER PUBLICATIONS

International Search Report of PCT Patent Application No. PCT/CN2017/101262 dated Dec. 15, 2017.

* cited by examiner

*Primary Examiner* — Basia A Ridley
*Assistant Examiner* — Christopher P Domone (57) ABSTRACT

Provided herein a method of preparing electrode assemblies for lithium-ion batteries. The method disclosed herein comprises a step of pre-drying separator in the battery manufacturing process before the stacking step, thereby significantly lowering the water content of the separator. Therefore, separators can be used to prepare electrode assemblies regardless of conditions under which they are stored or transported. In addition, the peeling strength between the porous base material and protective porous layer is largely unaffected by the drying process disclosed herein.

16 Claims, 2 Drawing Sheets

METHOD OF PREPARING ELECTRODE ASSEMBLIES

FIELD OF THE INVENTION

This invention relates to lithium-ion batteries in the application of sustainable energy area. More particularly, this invention relates to methods of preparing electrode assemblies.

BACKGROUND OF THE INVENTION

Lithium-ion batteries (LIBs) have attracted extensive attention in the past two decades for a wide range of applications in portable electronic devices such as cellular phones and laptop computers. Due to rapid market development of electric vehicles (EV) and grid energy storage, high-performance, low-cost LIBs are currently offering one of the most promising options for large-scale energy storage devices.

Currently, electrodes are prepared by dispersing fine powders of an active battery electrode material, a conductive agent, and a binder material in an appropriate solvent. The dispersion can be coated onto a current collector such as a copper or aluminum metal foil, and then dried at an elevated temperature to remove the solvent. Sheets of the cathode and anode are subsequently stacked or rolled with the separator separating the cathode and anode to form a battery. The separator is a physical barrier interposed between the anode and the cathode, which prevents physical contact therebetween.

The lithium-ion battery manufacturing process is sensitive to moisture. A battery with high water content leads to serious attenuation of electrochemical performance and affects stability of battery. Moisture in a battery can originate from various sources. One possible source of moisture comes from the separator. The separator may absorb moisture during manufacture, storage and transportation. It is particularly true when the separator is placed and stored in a moist environment. To address the moisture sensitive issue of electrode assembly, it is important to dry the separator before forming an electrode assembly so as to reduce the water content in the battery.

Korean Patent No. 101497348 B1 describes a method for preparing an electrode assembly. The method comprises the steps of forming a laminate by stacking a cathode, an anode, and a separator interposed between the two electrodes; heating the laminate; and pressurizing the heated laminate. The heating process melts part of the fibres of the separator in order to combine the electrodes and separator. However, this method does not dry the separator before assembling.

Korean Patent No. 101495761 B1 describes a method for preparing an electrode assembly. The method comprises the steps of preparing the negative and positive electrode plates; arranging a positive electrode plate, a negative electrode plate, and a separator to form an electrode assembly; forming a jelly roll by winding the electrode assembly; drying the jelly roll. However, this method also does not dry the separator before assembling.

Korean Patent No. 100759543 B1 describes a method for preparing an electrode assembly of a lithium-ion polymer battery. The method comprises the steps of preparing a positive electrode plate and a negative electrode plate; preparing a separator; heating the separator; and interposing the heated separator between the two electrode plates, wherein the separator is heated at an elevated temperature for 1-3 minutes. However, the heating process is used to remove the residual stress inside the separator so as to prevent shrinkage of the separator due to overheating of the battery.

The absence of a process of pre-drying separators in existing method introduces water into the electrode assemblies, which may affect the cycling stability and rate capability of LIBs. In view of the above, there is always a need to develop a method of drying separators of LIBs to low water content before assembling into an electrode assembly.

SUMMARY OF THE INVENTION

The aforementioned needs are met by various aspects and embodiments disclosed herein.

In one aspect, provided herein is a method of preparing an electrode assembly, comprising the steps of:

1) preparing a slurry comprising a conductive agent, an active battery electrode material and a binder material;
2) applying the slurry on a current collector to form a coated film on the current collector;
3) drying the coated film on the current collector;
4) pre-drying a separator under vacuum at a temperature from about 50° C. to about 150° C.;
5) stacking at least one anode, at least one cathode, and at least one pre-dried separator interposed between the at least one anode and at least one cathode; and
6) drying the electrode assembly.

In some embodiments, the separator is a non-woven fabric consisting of natural or polymeric fibers, and wherein the polymeric fibers has a melting point of 200° C. or higher.

In certain embodiments, the separator is a non-woven fabric made of polymeric fibers selected from the group consisting of polyolefin, polyethylene, high-density polyethylene, linear low-density polyethylene, low-density polyethylene, ultrahigh-molecular-weight polyethylene, polypropylene, polypropylene/polyethylene co-polymer, polybutylene, polypentene, polyacetal, polyamide, polycarbonate, polyimide, polyetherether ketone, polysulfones, polyphenylene oxide, polyphenylene sulfide, polyacrylonitrile, polyvinylidene fluoride, polyoxymethylene, polyvinyl pyrrolidone, polyester, polyethylene terephthalate, polybutylene terephthalate, polyethylene naphthalene, polybutylene naphthalate, and combinations thereof.

In some embodiments, the separator is pre-dried for a time period from about 2 hours to about 12 hours, or from about 2 hours to about 8 hours.

In certain embodiments, the separator is pre-dried under a pressure of less than 25 kPa, less than 15 kPa, less than 10 kPa, or less than 5 kPa.

In some embodiments, the separator comprises a porous base material and a protective porous layer coated on one or both surfaces of the porous base material, wherein the protective porous layer comprises a binder material and an inorganic filler, and wherein the peeling strength between the porous base material and protective porous layer is 0.04 N/cm or more, or 0.1 N/cm or more.

In certain embodiments, the inorganic filler is selected from the group consisting of $Al_2O_3$, $SiO_2$, $TiO_2$, $ZrO_2$, $BaO_x$, ZnO, $CaCO_3$, TiN, AlN, $MTiO_3$, $K_2O.nTiO_2$, $Na_2O.mTiO_2$, and combinations thereof, wherein x is 1 or 2; M is Ba, Sr or Ca; n is 1, 2, 4, 6 or 8; and m is 3 or 6.

In some embodiments, the binder material is selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof.

In certain embodiments, the weight ratio of the inorganic filler to the binder material is from about 99:1 to about 1:1.

In some embodiments, the separator has a thickness from about 1 μm to about 80 μm.

In certain embodiments, the separator has a porosity from about 40% to about 97%.

In some embodiments, the active battery electrode material is a cathode material selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.3 to 0.8; each y is independently from 0.1 to 0.45; and each z is independently from 0 to 0.2.

In certain embodiments, the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof. In certain embodiments, the conductive agent is not carbon, carbon black, graphite, expanded graphite, graphene, graphene nanoplatelets, carbon fibres, carbon nano-fibers, graphitized carbon flake, carbon tubes, carbon nanotubes, activated carbon, or mesoporous carbon.

In some embodiments, the electrode assembly is dried under a pressure of less than 25 kPa, less than 15 kPa, less than 10 kPa, or less than 5 kPa.

In certain embodiments, the electrode assembly is dried for a time period from about 2 hours to about 24 hours, or from about 4 hours to about 12 hours.

In some embodiments, the electrode assembly is dried at a temperature from about 70° C. to about 150° C.

In certain embodiments, the water content of the pre-dried separator is less than 50 ppm by weight, based on the total weight of the pre-dried separator.

In some embodiments, the water content of the dried electrode assembly is less than 20 ppm by weight, based on the total weight of the dried electrode assembly.

In another aspect, provided herein is a lithium battery comprising the electrode assembly prepared by the method disclosed herein.

DETAILED DESCRIPTION OF THE INVENTION

Provided herein is a method of preparing an electrode assembly, comprising the steps of:
1) preparing a slurry comprising a conductive agent, an active battery electrode material and a binder material;
2) applying the slurry on a current collector to form a coated film on the current collector;
3) drying the coated film on the current collector;
4) pre-drying a separator under vacuum at a temperature from about 50° C. to about 150° C.;
5) stacking at least one anode, at least one cathode, and at least one pre-dried separator interposed between the at least one anode and at least one cathode; and
6) drying the electrode assembly.

The term "electrode" refers to a "cathode" or an "anode."

The term "positive electrode" is used interchangeably with cathode. Likewise, the term "negative electrode" is used interchangeably with anode.

The term "binder material" refers to a chemical or a substance that can be used to hold the active battery electrode material and conductive agent in place, or a chemical or a substance used for joining an inorganic filler to a porous base material and to each other.

The term "water-based binder material" refers to a water-soluble or water-dispersible binder polymer. Some non-limiting examples of the water-based binder material include styrene-butadiene rubber, acrylated styrene-butadiene rubber, acrylonitrile-butadiene rubber, acryl rubber, butyl rubber, fluorine rubber, polytetrafluoroethylene, polyethylene, polypropylene, ethylene/propylene copolymers, polybutadiene, butyl rubber, fluorine rubber, polyethylene oxide, polyvinylpyrrolidone, polyepichlorohydrin, polyphosphazene, polyacrylonitrile, polystyrene, ethylene/propylene/diene copolymers, polyvinylpyridine, chlorosulfonated polyethylene, latex, polyester resins, acrylic resins, phenolic resins, epoxy resins, polyvinyl alcohol, carboxymethyl cellulose, hydroxypropyl cellulose, and combinations thereof.

The term "organic-based binder material" refers to a binder dissolved or dispersed in an organic solvent, in particular, N-methyl pyrrolidone (NMP). Some non-limiting examples of the organic-based binder material include polytetrafluoroethylene (PTFE), perfluoroalkoxy polymer (PFA), polyvinylidene fluoride (PVDF), copolymer of tetrafluoroethylene (TFE) and hexafluoropropylene (HFP), fluorinated ethylene-propylene (FEP) copolymer, and terpolymer of tetrafluoroethylene, hexafluoropropylene and vinylidene fluoride, and combinations thereof.

The term "conductive agent" refers to a chemical or a substance that enhances the electrically-conducting property of an electrode.

The term "applying" as used herein in general refers to an act of laying or spreading a substance on a surface.

The term "doctor blading" refers to a process for fabrication of large area films on rigid or flexible substrates. A coating thickness can be controlled by an adjustable gap width between a coating blade and a coating surface, which allows the deposition of variable wet layer thicknesses.

The term "current collector" refers to a support for coating the active battery electrode material and a chemically inactive high electron conductor for keeping an electric current flowing to electrodes during discharging or charging a secondary battery.

The term "pre-drying" refers to an act of removing the solvent or water from a material.

The term "water content" is used interchangeably with moisture content.

The term "electrode assembly" refers to a structure comprising at least one positive electrode, at least one negative electrode, and at least one separator interposed between the positive electrode and the negative electrode.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3600 coulombs of electrical charge. Similarly, the term "miniampere-hour (mAh)" also refers to a unit of the storage capacity of a battery and is 1/1,000 of an ampere-hour.

The term "battery cycle life" refers to the number of complete charge/discharge cycles a battery can perform before its nominal capacity falls below 80% of its initial rated capacity.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Polymers such as nylon, polyamide, polyester and polyvinyl alcohol are known to be hygroscopic and absorbs moisture during manufacture or during storage in an air atmosphere. These polymers will absorb moisture again during transport. However, humidity control during transport is complex and expensive. Separators made of these materials must therefore be dried before further processing. Generally, separators are dried after assembling into an electrode assembly. However, it has been difficult to thoroughly dry all the materials including cathode, anode and separator simultaneously to a low moisture content after assembling. It is especially true when separators have been stored in a moist condition before assembling.

In each of the steps 4 and 6, vacuum drying is carried out. The reason why drying is carried out in these two steps is that a large amount of moisture adhered to the separator cannot be satisfactorily removed by drying in only step 6. Residual moisture in the separator causes, for example, a problem such that the residual moisture mixed into electrodes and an electrolyte solution results in decomposition of the electrolyte solution, or a problem such that electrode active materials are altered in quality. Therefore, removal of moisture is crucial.

The separator may comprise woven or nonwoven polymeric fibers, natural fibers, carbon fibers, glass fibers or ceramic fibers. In certain embodiments, the separator comprises woven or nonwoven polymeric fibers.

In some embodiments, the fibers of the nonwoven or woven are made of organic polymers, such as polyolefin, polyethylene, high-density polyethylene, linear low-density polyethylene, low-density polyethylene, ultrahigh-molecular-weight polyethylene, polypropylene, polypropylene/polyethylene co-polymer, polybutylene, polypentene, polyacetal, polyamide, polycarbonate, polyimide, polyetherether ketone, polysulfones, polyphenylene oxide, polyphenylene sulfide, polyacrylonitrile, polyvinylidene fluoride, polyoxymethylene, polyvinyl pyrrolidone, polyester, polyethylene terephthalate, polybutylene terephthalate, polyethylene naphthalene, polybutylene naphthalate, derivatives thereof, or a combination thereof. In certain embodiments, the separator is made of polyolefinic fibers selected from the group consisting of polyethylene, high-density polyethylene, linear low-density polyethylene, low-density polyethylene, ultrahigh-molecular-weight polyethylene, polypropylene, polypropylene/polyethylene co-polymer, and combinations thereof. In some embodiments, the separator is made of polymeric fibers selected from the group consisting of polyester, polyacetal, polyamide, polycarbonate, polyimide, polyetherether ketone, polyether sulfone, polyphenylene oxide, polyphenylene sulfide, polyethylene naphthalene, and combinations thereof. In other embodiments, the polymeric fiber is not polyethylene, high-density polyethylene, linear low-density polyethylene, low-density polyethylene, ultrahigh-molecular-weight polyethylene, polypropylene, or polypropylene/polyethylene co-polymer. In further embodiments, the polymeric fiber is not polyacetal, polyether sulfone, polyphenylene oxide, polyphenylene sulfide, or polycarbonate. In still further embodiments, polymeric fiber is not polyamide, polyimide, or polyetherether ketone. But all other known polymeric fibers and many natural fibers can be used as well.

In certain embodiments, the separator disclosed herein has a melting point of 100° C. or higher, 120° C. or higher, 140° C. or higher, 160° C. or higher, 180° C. or higher, 200° C. or higher, or 250° C. or higher. In certain embodiments, the separator disclosed herein has a melting point of 140° C. or higher, 160° C. or higher, 180° C. or higher, 200° C. or higher, or 250° C. or higher.

In order to improve thermal stability of the separator, the fibers having a melting temperature of 200° C. or above should be used. In some embodiments, the fibers are selected from polyester. Some non-limiting examples of suitable polyester include polyethylene terephthalate, polybutylene terephthalate, polyethylene naphthalene, polybutylene naphthalate, derivatives thereof, and combinations thereof. The separator having high melting point shows high thermal stability and therefore can be pre-dried at high temperature without thermal shrinking. Also, separators with high melting point allow higher pre-drying temperatures, increasing the rate of evaporation of water and raising the efficiency of pre-drying.

The nonwoven fabric may be produced by a publicly known process. Some non-limiting examples of suitable process include dry process, spun bond process, water needle process, spun lace process, wet process, melt-blowing process and the like.

The separator can be in a coated or uncoated form. In some embodiments, the separator is uncoated and does not comprise a protective porous layer. In certain embodiments, the separator is coated and comprises a porous base material and a protective porous layer coated on one or both surfaces of the porous base material, wherein the protective porous layer comprises a binder material and an inorganic filler. In certain embodiments, the inorganic filler is selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2.

In certain embodiments, the inorganic filler has an average diameter from about 100 nm to about 2000 nm, from about 100 nm to about 1000 nm, from about 250 nm to about 1500 nm, from about 300 nm to about 3 μm, from about 500 nm to about 4.5 μm, from about 500 nm to about 6 μm, from about 1 μm to about 20 μm, from about 10 μm to about 20 μm, from about 1 μm to about 15 μm, from about 1 μm to about 7.5 μm, from about 1 μm to about 4.5 μm, from about 1 μm to about 3 μm, or from about 800 nm to about 2.5 μm.

An advantage of the coated separator is that it has outstanding safety and exhibits no or very slight contraction at high temperature. It is because the inorganic filler which adheres to the porous base material has a melting point which is well above the safety-relevant temperature range for electrochemical cells and hence suppresses thermal contraction of the separator.

In some embodiments, the thickness of a coated or uncoated separator is from about 10 μm to about 200 μm, from about 30 μm to about 100 μm, from about 10 μm to about 75 μm, from about 10 μm to about 50 μm, from about 10 μm to about 20 μm, from about 15 μm to about 40 μm, from about 15 μm to about 35 μm, from about 20 μm to about 40 μm, from about 20 μm to about 35 μm, from about 20 μm to about 30 μm, from about 30 μm to about 60 μm, from about 30 μm to about 50 μm, or from about 30 μm to about 40 μm.

In certain embodiments, the thickness of a coated or uncoated separator is less than 100 μm, less than 80 μm, less than 60 μm, less than 40 μm, less than 35 μm, less than 30 μm, less than 25 μm, or less than 20 μm. Thinner separators make it possible to build very compact batteries with a high energy density. Furthermore, if the separator is sufficiently thin, the moisture may be evaporated at high drying rates.

In some embodiments, the coated or uncoated separator has a porosity from about 50% to about 97%, from about 50% to about 95%, from about 50% to about 80%, from about 55% to about 90%, from about 55% to about 80%, from about 60% to about 95%, from about 60% to about 90%, from about 60% to about 80%, from about 65% to about 90%, from about 65% to about 80%, from about 70% to about 90%, from about 70% to about 80%, from about 75% to about 90%, or from about 80% to about 90%.

The nature of the separator disclosed herein comprises a particularly useful combination of thickness and porosity, meeting the requirements for separators in high power batteries, especially lithium high power batteries.

In some embodiments, the coated or uncoated separator can be dried in a drying chamber under vacuum before assembly. In certain embodiments, the drying chamber is connected to a vacuum pump, so that the pressure in the chamber can be reduced. The pressure is reduced sufficiently so as to lower the boiling point of water. The drying time can therefore be considerably reduced. In some embodiments, the drying chamber is connected to a central vacuum supply, thereby allowing several vacuum drying ovens to be operated simultaneously. In some embodiments, the number of vacuum drying ovens connected to a central vacuum supply ranges from 1 to 20 depending on the number of pumps operated.

In certain embodiments, the coated or uncoated separator can be dried under vacuum at a temperature from about 50° C. to about 150° C., from about 70° C. to about 150° C., from about 80° C. to about 150° C., from about 90° C. to about 150° C., from about 100° C. to about 150° C., from about 100° C. to about 140° C., from about 100° C. to about 130° C., from about 100° C. to about 120° C., from about 100° C. to about 110° C., or from about 110° C. to about 130° C. In certain embodiments, the coated or uncoated separator can be dried under vacuum at a temperature from about 80° C. to about 150° C. In some embodiments, the coated or uncoated separator can be dried under vacuum at a temperature of about 80° C. or higher, 90° C. or higher, 100° C. or higher, 110° C. or higher, 120° C. or higher, 130° C. or higher, 140° C. or higher, or 150° C. or higher. In certain embodiments, the coated or uncoated separator can be dried under vacuum at a temperature of less than 150° C., less than 145° C., less than 140° C., less than 135° C., less than 130° C., less than 120° C., less than 110° C., less than 100° C., or less than 90° C.

Separators composed of conventionally used polypropylene fibers and separators composed of cellulose pulps are less heat resistant as compared to other materials. When the separator is dried at the temperature of 100° C. or higher, there is a significant deterioration of the separators, such as fusion and carbonization. For coated separators composed of heat resistant materials as the porous base material, when the separator is dried at temperatures higher than 150° C., there is a significant deterioration of the binder material in the protective porous layer. In particular, when the binder material is a water-based binder material such as carboxymethyl cellulose (CMC) which is considered a brittle binder. In this case, the aqueous binder is likely to become brittle, resulting in a brittle protective porous layer, which may break after little deformation. Damage to a separator can cause a serious adverse effect on performance and safety of a lithium-ion secondary battery.

In some embodiments, the time period for drying the coated or uncoated separator under vacuum is from about 2 hours to about 24 hours, from about 2 hours to about 20 hours, from about 2 hours to about 12 hours, from about 2 hours to about 8 hours, from about 4 hours to 24 hours, from about 4 hours to about 20 hours, from about 4 hours to about 12 hours, from about 4 hours to about 8 hours, from about 8 hours to about 24 hours, from about 8 hours to about 16 hours, from 8 hours to 12 hours. In some embodiments, the time period for drying the coated or uncoated separator under vacuum is from about 2 hours to about 24 hours, or 4 hours to about 16 hours.

In certain embodiments, the pre-drying step comprises drying the coated separator with two drying stages, the first stage and the second stage, in which the temperature of the first stage is lower than the temperature of the second stage. A lower temperature in the first stage prevents rapid loss of surface moisture and increases product quality by virtually eliminating non-uniformity in drying. If drying is too rapid or the temperature is too high, this can cause uneven drying and may make the protective porous layer to shrink unevenly, thereby causing a reduction in separator peeling strength.

The temperature in the first stage can be within the range of 50° C. to 90° C. A partially-dried separator is obtained from the first stage. In some embodiments, the separator can be dried under vacuum in the first stage at a temperature of about 50° C. or higher, about 60° C. or higher, about 70° C. or higher, or about 80° C. or higher. In certain embodiments, the separator can be dried under vacuum in the first stage at a temperature of less than 90° C., less than 85° C., less than 80° C., less than 75° C., or less than 70° C.

A lower temperature in the first stage is beneficial to slow drying to avoid crack or embrittlement of the protective porous layer. Surface of the protective porous layer should dry out slowly to reduce possibility of surface cracking since the interior of the protective porous layer dries slower than the surface of the protective porous layer.

The drying time for the first stage can be in the range from about 5 minute to about 4 hours, from about 5 minutes to about 2 hours, or from about 15 minutes to about 30 minutes.

The temperature in the second stage can be within the range from 80° C. to 150° C., from about 100° C. to about 150° C., or from about 100° C. to about 140° C. In some embodiments, the separator can be dried under vacuum in the second stage at a temperature of about 80° C. or higher, about 90° C. or higher, about 100° C. or higher, about 110° C. or higher, about 120° C. or higher, about 130° C. or higher, or about 140° C. or higher. In certain embodiments, the separator can be dried under vacuum in the second stage at a temperature of less than 150° C., less than 140° C., less than 130° C., less than 120° C., or less than 110° C.

The drying time of the second stage can be in the range from about 15 minutes to about 4 hours, from about 5 minutes to about 2 hours, or from about 15 minutes to about 30 minutes.

Any vacuum pumps that can reduce the pressure of the drying chamber can be used herein. Some non-limiting examples of the vacuum pumps include dry vacuum pumps, turbo pumps, rotary vane vacuum pumps, cryogenic pumps, and sorption pumps.

In some embodiments, the vacuum pump is an oil free pump. The oil free pump operates without the need for oil in the pump parts which are exposed to gases being pumped, or partial vacuum. Thus, any gases backstreaming through the pump are free from oil vapour. Progressive oil vapour deposited on surfaces of the separator may reduce the electrochemical performance of a battery. An example of such pump is a diaphragm vacuum pump.

In some embodiments, the separator is pre-dried under atmospheric pressure. In certain embodiments, the pre-drying step is performed in a vacuum state. In further embodiments, the vacuum state is maintained at a pressure within the range from about $1\times10^{-1}$ Pa to about $1\times10^{-4}$ Pa, from about 10 Pa to about $1\times10^{-1}$ Pa, from about $1\times10^{3}$ Pa to about 10 Pa, or from about $2.5\times10^{4}$ Pa to about $1\times10^{3}$ Pa. In still further embodiments, the vacuum state is at a pressure of about $1\times10^{3}$ Pa, about $2\times10^{3}$ Pa, about $5\times10^{3}$ Pa, about $1\times10^{4}$ Pa, or about $2\times10^{4}$ Pa.

To reduce the power required for the pumps, a condenser can be provided between the drying chamber and the pump. The condenser condenses out water vapor, which is then separated.

After pre-drying, the separator can then be naturally cooled to 50° C. or less before being removed from the drying chamber. In some embodiments, the separator is cooled to 45° C. or less, 40° C. or less, 35° C. or less, 30° C. or less, or 25° C. or less before being removed from the drying chamber. In certain embodiments, the separator is cooled to room temperature. In some embodiments, the separator is cooled down by blowing a dry gas or inert gas in order to reach the target temperature more quickly.

It is not necessary to dry the separator to a very low water content. The remaining water content of the pre-dried separator can be further reduced by the subsequent drying step. In some embodiments, the water content in the pre-dried separator is less than 80 ppm, less than 70 ppm, less than 60 ppm, less than 50 ppm, less than 40 ppm, or less than 30 ppm by weight, based on the total weight of the pre-dried separator.

The pre-dried separator needs not be immediately used once they are dried and can be stored in an environment where the air has a dew point of −10° C. to 30° C. overnight before being used to prepare the electrode assemblies. However, direct further processing without storage is more effective with respect to energy.

In other embodiments, the coated or uncoated separator can be dried by a freeze dryer. The separator can be first frozen and the water is then removed as vapor from the frozen state. In some embodiments, the separator is first frozen at a freezing temperature between −0° C. and −80° C. for a period of 1 hour to 5 hours. The freeze-drying apparatus may include a vacuum chamber, a cold trap, a vacuum pump, and a cooling device.

The time of the freeze-drying process is variable but ordinarily the freeze-drying can be carried out over a period of from about 1 to about 20 hours. In certain embodiments, the time period for freeze drying is from about 1 hour to about 5 hours, from about 1 hour to about 3 hours, from about 1 hour to about 2 hours, from about 2 hours to about 5 hours, from about 2 hours to about 4 hours, or from about 2 hours to about 3 hours.

In some embodiments, the freeze-drying process can be carried out under a high vacuum. The ranges of pressure can be adequately achieved by a publicly known vacuum pump. In certain embodiments, the freeze-drying process can also be carried out at or near atmospheric pressure. The partial pressure of water in the drying chamber is held at very low value since it is essential to produce a large difference between the vapour pressure of the air in the drying chamber and that of the separator surface to ensure sublimation. Freeze drying at or near atmospheric pressure has the advantage of reducing the operation costs considerably since the application of high vacuum is not necessary.

In some embodiments, the water content in the pre-dried separator after freeze drying is less than 150 ppm, less than 100 ppm, less than 80 ppm, less than 70 ppm, less than 60 ppm, or less than 50 ppm by weight, based on the total weight of the pre-dried separator.

When the water content of the separator after freeze drying is higher than 150 ppm, the pre-dried separator can be further dried by blowing hot air. In some embodiments, the drying chamber blows hot air toward the separator from above and/or underneath. In certain embodiments, the hot air drying is performed at an air velocity from about 1 meter/second to about 50 meter/second, from about 1 meter/second to about 40 meter/second, from about 1 meter/second to about 30 meter/second, or from about 1 meter/second to about 20 meter/second. In other embodiments, a heated inert gas (i.e., helium, argon) is used instead of heated air.

The drying gas might be preheated through heat exchange surfaces. In some embodiments, the temperature of the hot air ranges from about 50° C. to about 100° C., from about 60° C. to about 100° C., from about 70° C. to about 100° C., from about 50° C. to about 90° C., or from about 60° C. to about 90° C. In certain embodiments, the time period for hot air drying is from about 15 minutes to about 5 hours, or from about 1 hour to about 3 hours.

The binder material in the protective porous layer performs a role of binding the inorganic filler on the porous base material. The inorganic filler could also be joined to each other by the binder material. In certain embodiments, the binder material is an organic polymer. The use of the organic polymer makes it possible to produce a separator with adequate mechanical flexibility.

In some embodiments, the binder material is selected from the group consisting of an organic-based binder material, a water-based binder material, or a mixture of water-based and organic-based binder materials. In certain embodiments, the binder material is selected from the group consisting of styrene-butadiene rubber (SBR), acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose (CMC), hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid (PAA), polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof. In some embodiments, the salt of alginic acid comprises a cation selected from Na, Li, K, Ca, $NH_4$, Mg, Al, or a combination thereof.

In certain embodiments, the binder material is selected from the group consisting of styrene-butadiene rubber, carboxymethyl cellulose, polyvinylidene fluoride, acrylonitrile copolymer, polyacrylic acid, polyacrylonitrile, poly(vinylidene fluoride)-hexafluoropropene, latex, a salt of alginic acid, and combinations thereof.

In some embodiments, the binder material is SBR, CMC, PAA, a salt of alginic acid, or a combination thereof. In some embodiments, the binder material is acrylonitrile copolymer. In certain embodiments, the binder material is polyacrylonitrile. In some embodiments, the binder material is free of styrene-butadiene rubber, carboxymethyl cellulose, polyvinylidene fluoride, acrylonitrile copolymer, polyacrylic acid, polyacrylonitrile, poly(vinylidene fluoride)-hexafluoropropene, latex, or a salt of alginic acid.

There is no particular limitation in mixing ratio of an inorganic filler to a binder material in the protective porous layer of the present invention. The mixing ratio of the inorganic filler to the binder material can be controlled according to the thickness and structure of the protective porous layer to be formed.

In some embodiments, a weight ratio of the inorganic filler to the binder material in the protective porous layer formed on the porous base material according to the present invention is from about 1:1 to about 99:1, from about 70:30 to about 95:5, from about 95:5 to about 35:65, from about 65:35 to about 45:55, from about 20:80 to about 99:1, from about 10:90 to about 99:1, from about 5:95 to about 99:1, from about 3:97 to about 99:1, from about 1:99 to about 99:1, or from about 1:99 to about 1:1.

If the weight ratio of the inorganic filler to the binder material is less than 1:99, the content of binder is so great that pore size and porosity of the protective porous layer may be decreased. When the content of the inorganic filler is greater than 99 wt. %, the polymer content is too low to provide sufficient adhesion among the inorganic filler, resulting in degradation in mechanical properties and impaired peeling resistance of a finally formed protective porous layer.

In certain embodiments, the amount of the binder material in the protective porous layer is at least 1%, at least 2%, at least 3%, at least 4%, at least 5%, at least 10%, at least 15%, at least 20%, at least 25%, at least 30%, at least 35%, at least 40%, at least 45%, or at least 50% by weight, based on the total weight of the protective porous layer. In some embodiments, the amount of the binder material in protective porous layer is at most 1%, at most 2%, at most 3%, at most 4%, at most 5%, at most 10%, at most 15%, at most 20%, at most 25%, at most 30%, at most 35%, at most 40%, at most 45%, or at most 50% by weight, based on the total weight of the protective porous layer.

In some embodiments, the amount of the binder material in the protective porous layer is from about 2 wt. % to about 10 wt. %, from about 3 wt. % to about 6 wt. %, from about 5 wt. % to about 10 wt. %, from about 7.5 wt. % to about 15 wt. %, from about 10 wt. % to about 20 wt. %, from about 15 wt. % to about 25 wt. %, from about 20 wt. % to about 40 wt. %, or from about 35 wt. % to about 50 wt. %, based on the total weight of the protective porous layer.

In certain embodiments, the active battery electrode material is a cathode material selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.3 to 0.8; each y is independently from 0.1 to 0.45; and each z is independently from 0 to 0.2. In certain embodiments, the cathode material is selected from the group consisting of $LiCoO_2$, $LiNiO_2$, $LiNi_xMn_yO_2$, $Li_{1+z}Ni_xMn_{-y}Co_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.4 to 0.6; each y is independently from 0.2 to 0.4; and each z is independently from 0 to 0.1. In other embodiments, the cathode material is not $LiCoO_2$, $LiNiO_2$, $LiV_2O_5$, $LiTiS_2$, $LiMoS_2$, $LiMnO_2$, $LiCrO_2$, $LiMn_2O_4$, $LiFeO_2$, or $LiFePO_4$ In further embodiments, the cathode material is not $LiNi_xMn_yO_2$, $Li_{1+z}Ni_xMn_yCo_{1-x-y}O_2$, or $LiNi_xCo_yAl_zO_2$, wherein each x is independently from 0.3 to 0.8; each y is independently from 0.1 to 0.45; and each z is independently from 0 to 0.2.

In some embodiments, the active battery electrode material is an anode material selected from the group consisting of natural graphite particulate, synthetic graphite particulate, Sn (tin) particulate, $Li_4Ti_5O_{12}$ particulate, Si (silicon) particulate, Si—C composite particulate, and combinations thereof. In other embodiments, the anode material is not natural graphite particulate, synthetic graphite particulate, Sn (tin) particulate, $Li_4Ti_5O_{12}$ particulate, Si (silicon) particulate, or Si—C composite particulate.

In certain embodiments, the amount of each of the cathode and anode materials is independently at least 50%, at least 55%, at least 60%, at least 65%, at least 70%, at least 75%, at least 80%, at least 85%, at least 90%, or at least 95% by weight, based on the total weight of the cathode or anode electrode layer. In some embodiments, the amount of each of the cathode and anode materials is independently at most 50%, at most 55%, at most 60%, at most 65%, at most 70%, at most 75%, at most 80%, at most 85%, at most 90%, or at most 95% by weight, based on the total weight of the cathode or anode electrode layer.

In some embodiments, the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof. In certain embodiments, the conductive agent is not carbon, carbon black, graphite, expanded graphite, graphene, graphene nanoplatelets, carbon fibres, carbon nano-fibers, graphitized carbon flake, carbon tubes, carbon nanotubes, activated carbon, or mesoporous carbon.

In certain embodiments, the amount of the conductive agent in each of the cathode and anode electrode layers is independently at least 1%, at least 2%, at least 3%, at least 4%, at least 5%, at least 10%, at least 15%, at least 20%, at least 25%, at least 30%, at least 35%, at least 40%, at least 45%, or at least 50% by weight, based on the total weight of the cathode or anode electrode layer. In some embodiments, the amount of the conductive agent in each of the cathode and anode electrode layers is independently at most 1%, at most 2%, at most 3%, at most 4%, at most 5%, at most 10%, at most 15%, at most 20%, at most 25%, at most 30%, at most 35%, at most 40%, at most 45%, or at most 50% by weight, based on the total weight of the cathode or anode electrode layer.

In some embodiments, the amount of the conductive agent in each of the cathode and anode electrode layers is independently from about 0.05 wt. % to about 0.5 wt. %, from about 0.1 wt. % to about 1 wt. %, from about 0.25 wt. % to about 2.5 wt. %, from about 0.5 wt. % to about 5 wt. %, from about 2 wt. % to about 5 wt. %, from about 3 wt. % to about 7 wt. %, or from about 5 wt. % to about 10 wt. %, based on the total weight of the cathode or anode electrode layer.

After assembling the electrode assembly, the electrode assembly is placed into a drying chamber. In some embodiments, the drying chamber is connected to a vacuum pump. In certain embodiments, the drying chamber is connected to a central vacuum supply. A vacuum pump or central vacuum supply is connected to the drying chamber by a suction line equipped with a gas outlet valve. In certain embodiments, the drying chamber is also connected to a gas reservoir containing a dry air or inert gas by a duct equipped with a gas inlet valve. When the gas outlet valve is closed and the gas inlet valve is opened, vacuum is lost in the drying chamber. The valve might be of a solenoid or needle type or a mass flow controller. Any devices allowing an appropriate flow adjustment might be used.

In some embodiments, the electrode assembly is loosely stacked. In the loosely stacked electrode assembly, there is a void space between the electrode layer and separator layer, allowing moisture to escape. Therefore, the loosely stacked electrode assembly can be effectively dried in a short period of time. On the other hand, when the electrode assembly is pressed under pressure before drying, the tightly packed electrode assembly has little or no void space between the electrode layer and separator layer, thus reducing airflow and drying efficiency.

In certain embodiments, the positive electrode, separator and negative electrode are stacked and spirally wound into a jelly-roll configuration before drying. Since a roll electrode assembly is tightly packed, there is also little or no void space between the electrode layer and separator layer, thus reducing airflow and drying efficiency.

To reduce the power required for the pumps, a condenser can be provided between the drying chamber and the pump. The condenser condenses out water vapor, which is then separated.

In some embodiments, the electrode assembly can be dried under vacuum at a temperature from about 70° C. to about 150° C., from about 80° C. to about 150° C., from about 90° C. to about 150° C., from about 100° C. to about 150° C., or from about 80° C. to about 130° C. In some embodiments, the electrode assembly can be dried under vacuum at a temperature of about 80° C. or higher, 90° C. or higher, 100° C. or higher, 110° C. or higher, 120° C. or higher, or 130° C. or higher. In certain embodiments, the electrode assembly can be dried under vacuum at a temperature of less than 150° C., less than 145° C., less than 140° C., less than 135° C., less than 130° C., less than 120° C., less than 110° C., less than 100° C., or less than 90° C.

In certain embodiments, the time period for drying the electrode assembly under vacuum is from about 5 minutes to about 12 hours, from about 5 minutes to about 4 hours, from about 5 minutes to about 2 hours, from about 5 minutes to about 1 hour, from about 15 minutes to about 3 hours, from about 1 hour to about 4 hours, from about 1 hour to about 2 hours, from about 2 hours to about 12 hours, from about 2 hours to about 8 hours, from about 2 hours to about 5 hours, from about 2 hours to about 3 hours, or from about 4 hours to about 12 hours.

In some embodiments, the drying of the electrode assembly is performed in a vacuum state. In further embodiments, the vacuum state is maintained at a pressure within the range from about $1\times10^{-1}$ Pa to about $1\times10^{-4}$ Pa, from about 10 Pa to about $1\times10^{-1}$ Pa, from about $1\times10^{3}$ Pa to about 10 Pa, or from about $2.5\times10^{4}$ Pa to about $1\times10^{3}$ Pa. In still further embodiments, the vacuum state is at a pressure of about $1\times10^{3}$ Pa, about $2\times10^{3}$ Pa, about $5\times10^{3}$ Pa, about $1\times10^{4}$ Pa, or about $2\times10^{4}$ Pa.

After a predetermined drying time period, the drying chamber vents directly to a gas reservoir containing dry air or inert gas via a gas inlet valve. In certain embodiments, the inert gas is selected from the group consisting of helium, argon, neon, krypton, xenon, nitrogen, carbon dioxide, and combinations thereof.

In some embodiments, the electrode assembly can be further dried under vacuum after incubating the electrode assembly with the dry gas for a predetermined time. This procedure can be repeated as many times as required to reduce the moisture content of the electrode assembly to an appropriate level. In certain embodiments, this procedure can be repeated around 2 to 50 times until the moisture content in the electrode assembly is less than 40 ppm, less than 30 ppm, less than 20 ppm, less than 15 ppm, less than 10 ppm, or less than 5 ppm, based on the total weight of the dried electrode assembly.

The advantages of the present invention is that most of the fabrication can take place outside a dry room. In some embodiments, the assembling process can take place outside a dry room or a glove box. In the present invention, only the step for filling electrolyte or both the steps for drying the electrode assembly and filing electrolyte are carried out in a dry room or a glove box. Thus, humidity control in the factory can be avoided, significantly lowering the investment cost.

The presence of moisture is detrimental to the operation of the battery. Generally, water content in the electrode assembly prepared by the conventional methods contains an amount of water greater than 100 ppm by weight, based on the total weight of the electrode assembly. Even if the initial battery performance is acceptable, the rate of deterioration of the battery performance may be unacceptable. To be able to achieve sufficiently high battery performance, it would therefore be advantageous to have a low water content in the battery.

In some embodiments, the water content in the dried electrode assembly is from about 5 ppm to about 50 ppm, from about 5 ppm to about 40 ppm, from about 5 ppm to about 30 ppm, from about 5 ppm to about 20 ppm, from about 5 ppm to about 10 ppm, from about 3 ppm to about 30 ppm, from about 3 ppm to about 20 ppm, or from about 3 ppm to about 10 ppm by weight, based on the total weight of the dried electrode assembly.

In certain embodiments, the water content in the dried electrode assembly is less than 30 ppm, less than 20 ppm, less than 10 ppm, less than 5 ppm, less than 4 ppm, less than 3 ppm, less than 2 ppm, or less than 1 ppm by weight, based on the total weight of the dried electrode assembly. In some embodiments, the dried electrode assembly disclosed herein has a water concentration therein no greater than about 5 ppm by weight, based on the total weight of the dried electrode assembly.

In some embodiments, the at least one anode and at least one cathode in the dried electrode assembly have a water content of less than 30 ppm, less than 20 ppm, less than 10 ppm, less than 5 ppm, or less than 3 ppm by weight, based on the total weight of the at least one dried anode and at least one dried cathode. In certain embodiments, the at least one separator in the dried electrode assembly has a water content of less than 30 ppm, less than 20 ppm, less than 10 ppm, less than 5 ppm, or less than 3 ppm by weight, based on the total weight of the dried separator. The separator in the electrode assembly disclosed herein comprises low water content, contributing to reliable performance of the lithium-ion batteries.

After drying, the electrode assembly can then be naturally cooled to 50° C. or less before being removed from the drying chamber. In some embodiments, the electrode assembly is cooled to 45° C. or less, 40° C. or less, 35° C. or less, 30° C. or less, or 25° C. or less. In certain embodiments, the electrode assembly is cooled to room temperature. In some embodiments, the electrode assembly is cooled down by blowing a dry gas or inert gas in order to reach the target temperature more quickly.

In the manufacture of batteries, it is important to have extremely thin separators so that the energy density of the battery maybe increased and the size of the battery may be reduced. Good peeling strength is important in battery manufacture because it prevents delamination of the separator. Therefore, a sufficient mechanical strength and a high puncture strength can be obtained. Battery separator having a sufficient puncture strength and peeling strength can withstand the rigors of battery manufacture, particularly in the manufacture of "jelly roll" type batteries.

In the case where the peeling strength of the separator is 0.04 N/cm or more, the separator has sufficient peeling strength and the coating layer will not separate during battery manufacture.

The drying process of the present invention does not affect the ultimate peeling strength of the separator. In some embodiments, the peeling strength between the porous base material and the protective porous layer is 0.03 N/cm or more, 0.05 N/cm or more, 0.07 N/cm or more, 0.1 N/cm or more, or 0.15 N/cm or more. In certain embodiments, the peeling strength between the porous base material and the protective porous layer is between 0.03 N/cm and 0.1 N/cm, between 0.03N/cm and 0.08 N/cm, between 0.03 N/cm and 0.075 N/cm, between 0.03 N/cm and 0.06 N/cm, between 0.05 N/cm and 0.25 N/cm, between 0.05 N/cm and 0.15 N/cm, between 0.05 N/cm and 0.12 N/cm, or between 0.05 N/cm and 0.1 N/cm.

In order to prevent moisture from being present within the sealed container, the step of filling electrolyte is carried out in a dry room. After drying, the electrode assembly is placed inside a container and then an electrolyte is added to fill the pores of all of the layers of separator and electrodes, and each of the gaps between the positive and negative electrodes and the separator in the electrode assembly under an inert atmosphere before sealing.

The method disclosed herein allows a reduction in occurrence of defective products, and ultimately allows an improvement in yield, thereby greatly reducing the manufacturing costs.

Also provided herein is a lithium battery comprising the electrode assembly prepared by the method disclosed herein.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

The water content in the electrode assembly was measured by Karl-fisher titration. The electrode assembly was cut into small pieces of 1 cm×1 cm in a glove box filled with argon gas. The cut electrode assembly having a size of 1 cm×1 cm was weighed in a sample vial. The weighed electrode assembly was then added into a titration vessel for Karl Fischer titration using Karl Fischer coulometry moisture analyzer (831 KF Coulometer, Metrohm, Switzerland). Measurements were repeated three times to find the average value.

The water content in the separator was measured by Karl-fisher titration. The electrode assembly was cut into small pieces of 1 cm×1 cm in a glove box filled with argon gas. The electrode assembly was separated into the anode, cathode and separator layers. The water contents of the separated separator layers were analysed by Karl Fischer titration. Measurements were repeated three times to find the average value.

The peeling strengths of the separators were measured by a peeling tester (obtained from Instron, US; model no. MTS 5581). The dried electrode assembly was separated into the anode, cathode and separator layers. Each of the separator layers was cut into a rectangular shape having a size of 25 mm×100 mm. Then, a strip of mending tape (3M; US; model no. 810) was attached onto the separator surface having the protective porous coating layer, and then pressed by a reciprocating movement of a 2 kg roller thereon to prepare samples for peeling strength test. Each of the samples was mounted on the peeling tester, followed by measurement of the peeling strength by peeling off the mending tape at 180° at room temperature. The mending tape was peeled off at a rate of 50 mm/minute. Measurements were taken at a predetermined interval of 10 mm to 70 mm and were repeated 3 times.

Example 1

A) Preparation of Positive Electrode

A positive electrode slurry was prepared by mixing 94 wt. % cathode material (LNMC TLM 310, obtained from Xinxiang Tianli Energy Co. Ltd., China), 3 wt. % carbon black (SuperP; obtained from Timcal Ltd, Bodio, Switzerland) as a conductive agent, and 0.8 wt. % polyacrylic acid (PAA, #181285, obtained from Sigma-Aldrich, US), 1.5 wt. % styrene butadiene rubber (SBR, AL-2001, obtained from NIPPON A&L INC., Japan) and 0.7 wt. % polyvinylidene fluoride (PVDF; Solef® 5130, obtained from Solvay S.A., Belgium) as a binder, which were dispersed in deionized water to form a slurry with a solid content of 50 wt. %. The slurry was homogenized by a planetary stirring mixer.

The homogenized slurry was coated onto both sides of an aluminum foil having a thickness of 20 μm using a transfer coater (ZY-TSF6-6518, obtained from Jin Fan Zhanyu New Energy Technology Co. Ltd., China) with an area density of about 26 mg/cm$^2$. The coated films on the aluminum foil were dried for 3 minutes by a 24-meter-long conveyor hot air drying oven as a sub-module of the transfer coater operated at a conveyor speed of about 8 meter/minute to obtain a positive electrode. The temperature-programmed oven allowed a controllable temperature gradient in which the temperature gradually rose from the inlet temperature of 60° C. to the outlet temperature of 75° C.

B) Preparation of Negative Electrode

A negative electrode slurry was prepared by mixing 90 wt. % hard carbon (HC; 99.5% purity, Ruifute Technology Ltd., Shenzhen, Guangdong, China), 5 wt. % carbon black and 5 wt. % polyacrylonitrile in deionized water to form a slurry having a solid content of 50 wt. %. The slurry was coated onto both sides of a copper foil having a thickness of 9 μm using a transfer coater with an area density of about 15 mg/cm$^2$. The coated films on the copper foil were dried at about 50° C. for 2.4 minute by a 24-meter-long conveyor hot air dryer operated at a conveyor speed of about 10 meter/minute to obtain a negative electrode.

C) Preparation of Separator

An aqueous binder solution was prepared by dissolving 50 g of CMC in 6.55 L de-ionized water. To the aqueous binder solution were added 100 g of $Al_2O_3$ particles (obtained from Taimei Chemicals Co. Ltd., Japan; product no. TM-100) and 7.5 g of SBR. The inorganic particles had an average diameter of 9 μm. After the addition, the suspension was stirred for 30 minutes at room temperature at a stirring speed of 50 rpm to form a slurry.

A 30 cm wide microporous membrane made of polyethylene (Celgard, LLC, US) having a thickness of 25 μm was then coated with the above slurry by a continuous roll coater having a doctor blade (obtained from Shenzhen KEJINGSTAR Technology Ltd., China; model no. AFA-EI300-UL). The coated separator subsequently passed through an oven integrated in the roll coater and dried at a temperature of 100° C. in a hot air stream. The coating speed was in the range of 1.2-1.7 meter/minute. A coating thickness was controlled by an adjustable gap width between a coating blade and coating surface. A coated separator having a total thickness of about 30 μm and a porosity of about 62% was obtained. The resulting separator was stored in a moist condition having a dew point of about 25° C. for 1 month to simulate long-term storage condition. The average value of moisture content of the separator was above 500 ppm.

After being stored for 1 month, the separator was dried in a vacuum oven under a pressure of $5 \times 10^3$ Pa at 75° C. for 2 hours during the first stage of drying. The separator was further dried under vacuum at $5 \times 10^3$ Pa at 90° C. for 1.5 hours during the second stage of drying. The average value of moisture content of the separator was 58 ppm.

Electrode Peeling Strengths

The average values of peeling strengths of the pre-dried separator and unprocessed separator were 0.08 N/cm and 0.07 N/cm respectively. The peeling strengths remained largely unaffected by the drying process.

Example 2

Assembling of Electrode Assembly

The resulting cathode and anode films prepared by methods described in Example 1 were used to prepare the cathode and anode respectively by cutting into individual electrode plates. The pre-dried separator was cut into individual plates. An electrode assembly was prepared by stacking anodes, cathodes and separators interposed between the positive electrode and the negative electrode in the open air with no control of humidity. The electrode assembly was dried in a vacuum oven inside a glove box under a pressure of $5 \times 10^3$ Pa at 100° C. for 2 hours. The drying chamber was then filled with hot, dry air having a water content of 5 ppm and a temperature of 90° C. The hot, dry air was retained in the drying chamber for 15 minutes before evacuating the drying chamber. This cycle was repeated 10 times. The average value of moisture content of the dried electrode assembly was 15 ppm.

Assembling of Pouch-Type Battery

A pouch cell was assembled by packaging the dried electrode assembly in a case made of an aluminum-plastic laminated film. The cathode and anode electrode plates were kept apart by separators and the case was pre-formed. An electrolyte was then filled into the case holding the packed electrodes in high-purity argon atmosphere with moisture and oxygen content <1 ppm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. After electrolyte filling, the pouch cells were vacuum sealed and then mechanically pressed using a punch tooling with standard square shape.

Electrochemical Measurements of Example 2

I) Nominal Capacity

The cell was tested galvanostatically at a current density of C/2 at 25° C. on a battery tester (BTS-5V20A, obtained from Neware Electronics Co. Ltd, China) between 3.0 V and 4.2 V. The nominal capacity was about 9 Ah.

II) Cyclability Performance

Figure 1:
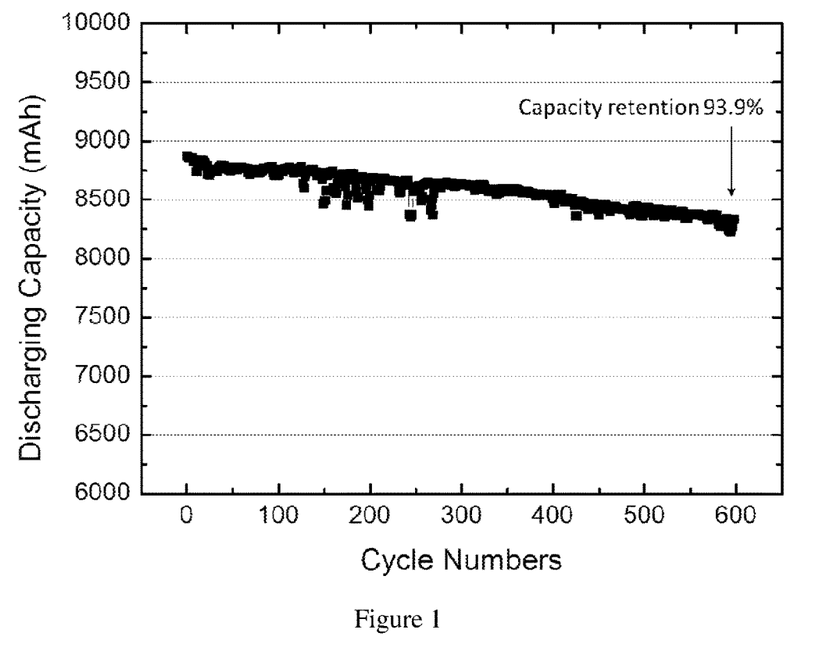
FIG. 1 depicts cycling performance of an electrochemical cell containing an electrode assembly prepared by the method described in Example 2.

The cyclability performance of the pouch cell was tested by charging and discharging at a constant current rate of 1 C between 3.0 V and 4.2 V. Test result of cyclability performance is shown in FIG. 1. The capacity retention after 598 cycles was about 93.9% of the initial value. The electrochemical tests show good electrochemical stability of the battery in a wide range of potential, as well as outstanding cycle performance.

Example 3

A) Preparation of Positive Electrode

A positive electrode slurry was prepared by mixing 92 wt. % cathode material ($LiMn_2O_4$ obtained from HuaGuan HengYuan LiTech Co. Ltd., Qingdao, China), 4 wt. % carbon black (SuperP; obtained from Timcal Ltd, Bodio, Switzerland) as a conductive agent, and 4 wt. % polyvinylidene fluoride (PVDF; Solef® 5130, obtained from Solvay S.A., Belgium) as a binder, which were dispersed in N-methyl-2-pyrrolidone (NMP; purity of ≥99%, Sigma-Aldrich, USA) to form a slurry with a solid content of 50 wt. %. The slurry was homogenized by a planetary stirring mixer.

The homogenized slurry was coated onto both sides of an aluminum foil having a thickness of 20 μm using a transfer coater with an area density of about 40 mg/cm². The coated films on the aluminum foil were dried for 6 minutes by a 24-meter-long conveyor hot air drying oven as a sub-module of the transfer coater operated at a conveyor speed of about 4 meter/minute to obtain a positive electrode. The temperature-programmed oven allowed a controllable temperature gradient in which the temperature gradually rose from the inlet temperature of 65° C. to the outlet temperature of 80° C.

B) Preparation of Negative Electrode

A negative electrode slurry was prepared by mixing 90 wt. % of hard carbon (HC; purity of 99.5%, obtained from Ruifute Technology Ltd., Shenzhen, Guangdong, China) with 1.5 wt. % carboxymethyl cellulose (CMC, BSH-12, DKS Co. Ltd., Japan) and 3.5 wt. % SBR (AL-2001, NIPPON A&L INC., Japan) as a binder, and 5 wt. % carbon black as a conductive agent, which were dispersed in deionized water to form another slurry with a solid content of 50 wt. %. The slurry was coated onto both sides of a copper foil having a thickness of 9 μm using a transfer coater with an area density of about 15 mg/cm². The coated films on the copper foil were dried at about 50° C. for 2.4 minutes by a 24-meter-long conveyor hot air dryer operated at a conveyor speed of about 10 meter/minute to obtain a negative electrode.

C) Preparation of Separator

An aqueous binder solution was prepared by dissolving 50 g of CMC in 6.55 L de-ionized water. To the aqueous binder solution were added 100 g of $TiO_2$ particles (obtained from Shanghai Dian Yang Industry Co. LTD, China) and 7.5 g of SBR. The inorganic particles had an average diameter of 10 μm. After the addition, the suspension was stirred for 30 minutes at room temperature at a stirring speed of 50 rpm to form a slurry.

A 30 cm wide nonwoven PET fabric (obtained from MITSUBISHI PAPER MILLS LTD, Japan) having a thickness of about 20 μm and a weight per unit area of about 10 g/m² was then coated with the above slurry by a continuous roll coater having a doctor blade (obtained from Shenzhen KEJINGSTAR Technology Ltd., China; model no. AFA-EI300-UL). The coated separator subsequently passed through an oven integrated in the roll coater and dried at a temperature of 100° C. in a hot air stream. The coating speed was in the range of 1.2-1.7 meter/minute. A coating thickness was controlled by an adjustable gap width between a coating blade and coating surface. A coated separator having a total thickness of about 30 μm and a porosity of about 62% was obtained. The separator was stored in a moist condition having a dew point of about 20° C. for 1 month to simulate long-term storage condition. The average value of moisture content of the separator was above 1,000 ppm.

After being stored for 1 month, the separator was dried in a vacuum oven under a pressure of $1 \times 10^3$ Pa at 85° C. for 4 hours. The average value of moisture content of the separator was 43 ppm.

Electrode Peeling Strengths

The average values of peeling strengths of the pre-dried separator and unprocessed separator were 0.07 N/cm and 0.06 N/cm respectively. The peeling strengths remained largely unaffected by the drying process.

Example 4

Assembling of Electrode Assembly

The resulting cathode and anode films prepared by methods described in Example 3 were used to prepare the cathode and anode respectively by cutting into individual electrode plates. The pre-dried separator was cut into individual plates. An electrode assembly was prepared by stacking anodes, cathodes and separators interposed between the positive electrode and the negative electrode in the open air with no control of humidity. The electrode assembly was dried in a vacuum oven inside a glove box under a pressure of $10 \times 10^3$ Pa at 102° C. for 3 hours. The drying chamber was then filled with hot, dry nitrogen having a water content of 5 ppm and a temperature of 85° C. The hot, dry air was retained in the drying chamber for 5 minutes before evacuating the drying chamber. This cycle was repeated 10 times. The average value of moisture content of the dried electrode assembly was 23 ppm.

Assembling of Pouch-Type Battery

A pouch cell was assembled by packaging the dried electrode assembly in a case made of an aluminum-plastic laminated film. The cathode and anode electrode plates were kept apart by separators and the case was pre-formed. An electrolyte was then filled into the case holding the packed electrodes in high-purity argon atmosphere with moisture and oxygen content <1 ppm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. After electrolyte filling, the pouch cells were vacuum sealed and then mechanically pressed using a punch tooling with standard square shape.

Electrochemical Measurements of Example 4

I) Nominal Capacity

The cell was tested galvanostatically at a current density of C/2 at 25° C. on a battery tester between 3.0 V and 4.2 V. The nominal capacity was about 9.1 Ah.

II) Cyclability Performance

Figure 2:
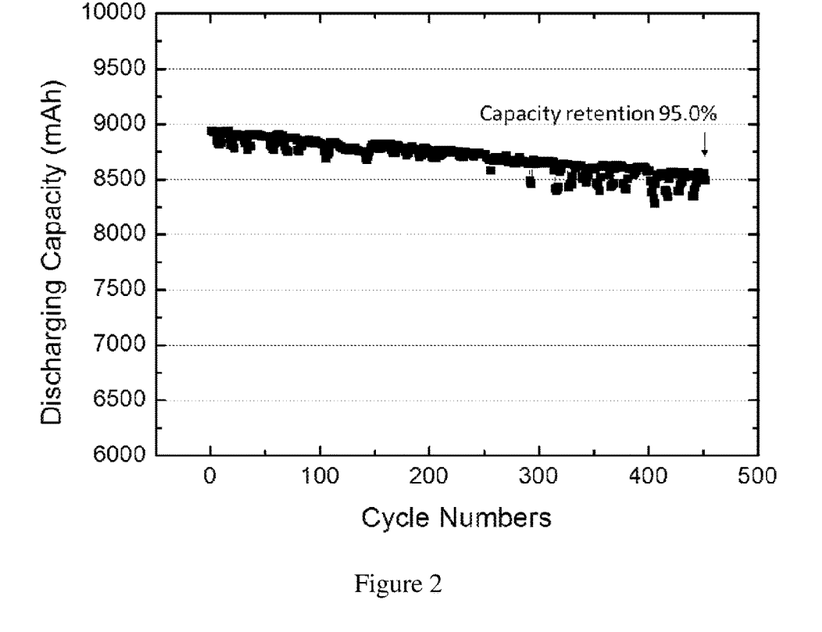
FIG. 2 depicts cycling performance of an electrochemical cell containing an electrode assembly prepared by the method described in Example 4.

The cyclability performance of the pouch cell was tested by charging and discharging at a constant current rate of 1 C between 3.0 V and 4.2 V. Test result of cyclability performance is shown in FIG. 2. The capacity retention after 452 cycles was about 95.0% of the initial value. The electrochemical tests show the good electrochemical stability of the battery in a wide range of potential, as well as outstanding cycle performance.

Example 5

A) Preparation of Positive Electrode

A positive electrode slurry was prepared by mixing 94 wt. % cathode material $LiNi_{0.33}Mn_{0.33}Co_{0.33}O_2$ (obtained from Shenzhen Tianjiao Technology Co. Ltd., China), 3 wt. % carbon black (SuperP; obtained from Timcal Ltd, Bodio, Switzerland) as a conductive agent, and 1.5 wt. % polyacrylic acid (PAA, #181285, obtained from Sigma-Aldrich, US) and 1.5 wt. % polyacrylonitrile (LA 132, Chengdu Indigo Power Sources Co., Ltd., China) as a binder, which were dispersed in deionized water to form a slurry with a solid content of 50 wt. %. The slurry was homogenized by a planetary stirring mixer.

The homogenized slurry was coated onto both sides of an aluminum foil having a thickness of 20 μm using a transfer coater with an area density of about 32 mg/cm². The coated films on the aluminum foil were dried for 4 minutes by a 24-meter-long conveyor hot air drying oven as a sub-module of the transfer coater operated at a conveyor speed of about 6 meter/minute to obtain a positive electrode. The temperature-programmed oven allowed a controllable temperature gradient in which the temperature gradually rose from the inlet temperature of 60° C. to the outlet temperature of 75° C.

B) Preparation of Negative Electrode

A negative electrode slurry was prepared by mixing 90 wt. % hard carbon, 5 wt. % carbon black and 5 wt. % polyacrylonitrile in deionized water to form a slurry having a solid content of 50 wt. %. The slurry was coated onto both sides of a copper foil having a thickness of 9 μm using a transfer coater with an area density of about 15 mg/cm$^2$. The coated films on the copper foil were dried at about 50° C. for 2.4 minutes by a 24-meter-long conveyor hot air dryer operated at a conveyor speed of about 10 meter/minute to obtain a negative electrode.

C) Pre-Treatment of Separator

A ceramic-coated PET microporous separator (obtained from MITSUBISHI PAPER MILLS LTD, Japan) having a thickness of about 30 μm was used. The separator was stored in a moist condition having a dew point of about 16° C. for 1 month to simulate long-term storage condition. The average value of moisture content of the separator was above 800 ppm.

After being stored for 1 month, the separator was dried in a vacuum oven under a pressure of 2×10$^3$ Pa at 90° C. for 2.5 hours. The average value of moisture content of the separator was 52 ppm.

Electrode Peeling Strengths

The average values of peeling strengths of the pre-dried separator and unprocessed separator were 0.11 N/cm and 0.09 N/cm respectively. The peeling strengths remained largely unaffected by the drying process.

Example 6

Assembling of Electrode Assembly

The resulting cathode and anode films prepared by methods described in Example 5 were used to prepare the cathode and anode respectively by cutting into individual electrode plates. The pre-dried separator was cut into individual plates. An electrode assembly was prepared by stacking anodes, cathodes and separators interposed between the positive electrode and the negative electrode in the open air with no control of humidity. The electrode assembly was dried in a vacuum oven inside a glove box under a pressure of 1×10$^3$ Pa at 110° C. for 2 hours. The drying chamber was then filled with hot, dry air having a water content of 5 ppm and a temperature of 100° C. The hot, dry air was retained in the drying chamber for 10 minutes before evacuating the drying chamber. This cycle was repeated 10 times. The average value of moisture content of the dried electrode assembly was 18 ppm.

Assembling of Pouch-Type Battery

A pouch cell was assembled by packaging the dried electrode assembly in a case made of an aluminum-plastic laminated film. The cathode and anode electrode plates were kept apart by separators and the case was pre-formed. An electrolyte was then filled into the case holding the packed electrodes in high-purity argon atmosphere with moisture and oxygen content <1 ppm. The electrolyte was a solution of LiPF$_6$ (1 M) in a mixture of ethylene carbonate (EC), ethyl methyl carbonate (EMC) and dimethyl carbonate (DMC) in a volume ratio of 1:1:1. After electrolyte filling, the pouch cells were vacuum sealed and then mechanically pressed using a punch tooling with standard square shape.

Electrochemical Measurements of Example 6

I) Nominal Capacity

The cell was tested galvanostatically at a current density of C/2 at 25° C. on a battery tester between 3.0 V and 4.2 V. The nominal capacity was about 8.9 Ah.

II) Cyclability Performance

Figure 3:
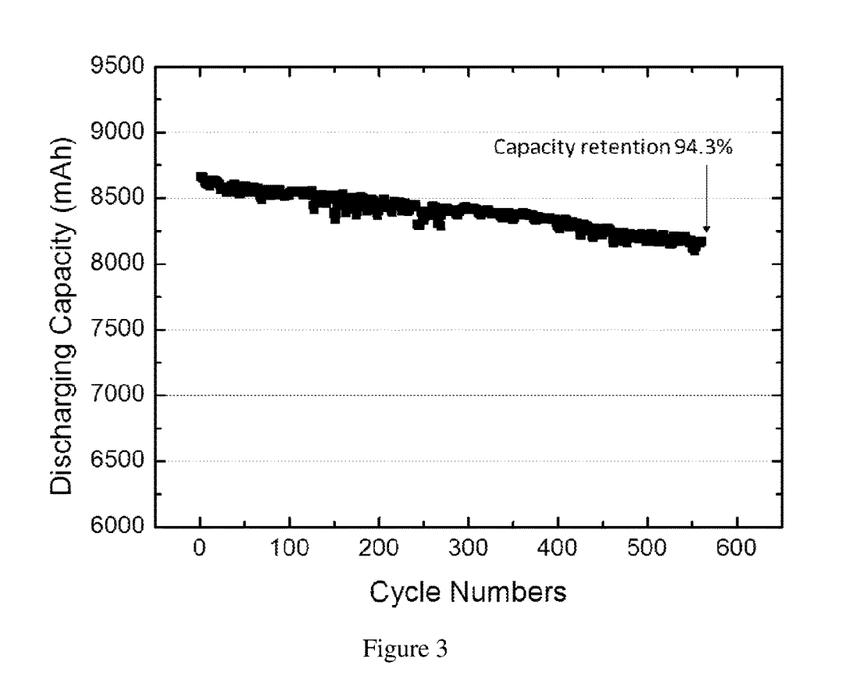
FIG. 3 depicts cycling performance of an electrochemical cell containing an electrode assembly prepared by the method described in Example 6.

The cyclability performance of the pouch cell was tested by charging and discharging at a constant current rate of 1 C between 3.0 V and 4.2 V. Test result of cyclability performance is shown in FIG. 3. The capacity retention after 561 cycles was about 94.3% of the initial value. The electrochemical tests show the good electrochemical stability of the battery in a wide range of potential, as well as outstanding cycle performance.

Example 7

Pre-Treatment of Separator

An uncoated microporous separator made of nonwoven PET fabric (obtained from MITSUBISHI PAPER MILLS LTD, Japan) having a thickness of about 20 μm was used. The separator was stored in a moist condition having a dew point of about 16° C. for 1 month to simulate long-term storage condition. The average value of moisture content of the separator was above 800 ppm.

After being stored for 1 month, the separator was dried in a vacuum oven under a pressure of 2×10$^3$ Pa at 100° C. for 2 hours. The average value of moisture content of the separator was 42 ppm. After drying, the water content of the dried separator was significantly lowered.

Example 8

Preparation of Separator

The coated separator was prepared by the method described in Example 3. The separator was then stored in a moist condition having a dew point of about 20° C. for 1 month to simulate long-term storage condition. The average value of moisture content of the separator was above 1,000 ppm.

After being stored for 1 month, the separator was dried in a vacuum oven under a pressure of 4.5×10$^3$ Pa at 155° C. for 2 hours. The average value of moisture content of the separator was 23 ppm.

Electrode Peeling Strengths

The average values of peeling strengths of the pre-dried separator and unprocessed separator were 0.035 N/cm and 0.075 N/cm respectively. The peeling strength of the unprocessed separator has significantly dropped after the pre-drying step. This makes the separator prone to mechanical failure when an electrode assembly is assembled by an automatic, high speed stacking machine. In this case, the separator underwent degradation during the heat treatment at high temperature, in which the aqueous binder material in the coating became brittle. Therefore, a lower temperature is beneficial to slow drying to avoid crack or embrittlement of the protective porous layer.

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist.

The appended claims intend to cover all those modifications and variations as falling within the scope of the invention.

What is claimed is:

1. A method of preparing an electrode assembly, comprising the steps of:
   1) preparing a slurry comprising a conductive agent, an active battery electrode material and a binder material;
   2) applying the slurry on a current collector to form a coated film on the current collector;
   3) drying the coated film on the current collector;
   4) pre-drying a coated separator comprising a porous base material and a protective porous layer coated on one or both surfaces of the porous base material under vacuum at a temperature from about 80° C. to about 150° C. wherein the separator has a melting point of 160° C. or higher, and wherein the water content of the separator before pre-drying is above 500 ppm by weight, based on the total weight of the separator before pre-drying;
   5) stacking at least one anode, at least one cathode, and at least one pre-dried separator interposed between the at least one anode and at least one cathode, wherein the water content of the pre-dried separator is less than 60 ppm by weight, based on the total weight of the pre-dried separator; and
   6) drying the electrode assembly;
   wherein the porous base material comprises polymeric fibers selected from the group consisting of polyacetal, polyamide, polycarbonate, polyamide, polyetherether ketone, polysulfones, polyphenylene oxide, polyphenylene sulfide, polyacrylonitrile, polyvinylidene fluoride, polyvinyl pyrrolidone, polyester, polyethylene terephthalate, polybutylene terephthalate, polyethylene naphthalene, polybutvlene naphthalate, and combinations thereof;
   wherein the protective porous layer comprises an inorganic filler selected from the group consisting of $Al_2O_3$, $SiO_2$, $TiO_2$, $ZrO_2$, $BaO_x$, $ZnO$, $CaCO_3$, $TiN$, $AlN$, $MTiO_3$, $K_2O \cdot nTiO_2$, $Na_2O \cdot mTiO_2$, and combinations thereof, wherein x is 1 or 2; M is Ba, Sr or Ca; n is 1, 2, 4, 6 or 8; and m is 3 or 6; and
   wherein the peeling strengths of the separator before pre-drying and the pre-dried separator are independently between 0.05 N/cm and 0.25 N/cm.

2. The method of claim 1, wherein the porous base material of the separator has a melting point of 200° C. or higher.

3. The method of claim 1, wherein the separator is pre-dried for a time period from about 2 hours to about 12 hours, or from about 2 hours to about 8 hours.

4. The method of claim 1, wherein the separator is pre-dried under a pressure of less than 25 kPa, less than 15 kPa, less than 10 kPa, or less than 5 kPa.

5. The method of claim 1, wherein the protective porous layer further comprises a binder material selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof.

6. The method of claim 5, wherein the weight ratio of the inorganic filler to the binder material is from about 99:1 to about 1:1.

7. The method of claim 1, wherein the separator has a thickness from about 1 μm to about 80 μm.

8. The method of claim 1, wherein the separator has a porosity from about 40% to about 97%.

9. The method of claim 1, wherein the active battery electrode material is a cathode material selected from group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.3 to 0.8; each y is independently from 0.1 to 0.45; and each z is independently from 0 to 0.2.

10. The method of claim 1, wherein the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof.

11. The method of claim 1, wherein the electrode assembly is dried under a pressure of less than 25 kPa, less than 15 kPa, less than 10 kPa, or less than 5 kPa.

12. The method of claim 1, wherein the electrode assembly is dried for a time period from about 2 hours to about 24 hours, or from about 4 hours to about 12 hours.

13. The method of claim 1, wherein the electrode assembly is dried at a temperature from about 70° C. to about 150° C.

14. The method of claim 1, wherein the water content of the pre-dried separator is less than 50 ppm by weight, based on the total weight of the pre-dried separator.

15. The method of claim 1, wherein the water content of the dried electrode assembly is less than 20 ppm by weight, based on the total weight of the dried electrode assembly.

16. A lithium battery comprising the electrode assembly prepared by the method of claim 1.

* * * * *

UNITED STATES PATENT AND TRADEMARK OFFICE
CERTIFICATE OF CORRECTION

PATENT NO.         : 10,084,178 B2
APPLICATION NO.    : 15/272544
DATED              : September 25, 2018
INVENTOR(S)        : Kam Piu Ho, Ranshi Wang and Peihua Shen Page 1 of 1

It is certified that error appears in the above-identified patent and that said Letters Patent is hereby corrected as shown below:

In the Specification

Column 12, Line 41, "$Li_{1+z}Ni_xMn_{-y}Co_{1-x-y}O_2$" should read -- $Li_{1+z}Ni_xMn_yCo_{1-x-y}O_2$ --.

Column 20, Line 55, "$LiNi_{0.33}Mn_{0.33}CO_{0.33}O_2$" should read -- $LiNi_{0.33}Mn_{0.33}Co_{0.33}O_2$ --.

In the Claims

Column 23, Line 28, "polyamide, polycarbonate, polyamide" should read -- polyamide, polycarbonate, polyimide --.

Column 23, Line 33, "polybutvlene naphthalate" should read -- polybutylene naphthalate --.

Signed and Sealed this
Eleventh Day of December, 2018

Andrei Iancu
*Director of the United States Patent and Trademark Office*